Jan. 1, 1963 A. MAURER ET AL 3,071,020
CHAIN FOR AN INFINITELY VARIABLE SPEED DRIVE
Filed Oct. 14, 1960 3 Sheets-Sheet 1

INVENTORS.
ALBRECHT MAURER
WILHELM BESEL
BY Kurt Kelman
AGENT

INVENTORS.
ALBRECHT MAURER
WILHELM BESEL

By Kurt Kelman
AGENT

Jan. 1, 1963   A. MAURER ET AL   3,071,020
CHAIN FOR AN INFINITELY VARIABLE SPEED DRIVE
Filed Oct. 14, 1960   3 Sheets-Sheet 3

INVENTORS
ALBRECHT MAURER
WILHELM BESEL

BY Kurt Kelman
AGENT

United States Patent Office 3,071,020
Patented Jan. 1, 1963

3,071,020
CHAIN FOR AN INFINITELY VARIABLE SPEED DRIVE
Albrecht Maurer and Wilhelm Besel, Bad Homburg vor der Hohe, Germany, assignors to Firma Ringspann Albrecht Maurer K.G., Bad Homburg vor der Hohe, Germany
Filed Oct. 14, 1960, Ser. No. 62,654
Claims priority, application Germany Oct. 23, 1959
10 Claims. (Cl. 74—236)

This invention relates to chain drive transmissions, and more particularly to chain transmissions which permit stepless variation of the transmission ratio. More specifically, the invention is concerned with an improved chain which is to be trained over two V-pulleys of variable width mounted on a driving and a driven shaft respectively for transmitting movement therebetween.

In the basically known type of chain transmission for which the chain of the invention is intended, each V-pulley consists of two disks which are axially movable relative to each other on the respective shaft. Their opposite radial faces are of approximately conical shape and provided with alternating radially elongated grooves and ridges angularly aligned in such a manner that the grooves on one face are opposite the ridges on the other, and vice versa. The contours of opposite ridges and grooves are parallel. When the disks on the driving shaft are moved apart, the pitch diameter of the V-pulley is decreased. If simultaneously the two disks of the driven shaft move nearer each other by a suitable distance, the pitch diameter of the driven pulley is increased, and the transmission ratio is decreased without a change in chain length.

The conventional chain capable of meshing engagement with the radial ribs and grooves of the pulleys consists of links which are hingedly connected. Juxtaposed thin and relatively narrow blades of metal, hereinafter referred to as slats, form a pack slidably confined in a cage in each link. The cage is mounted in aligned conforming transverse openings through all the link plates of which the link is composed. The ends of the slats laterally project from the chain links for engagement with the pulley disks. The slats are capable of individual transverse sliding movement in their cage. This permits them to adjust themselves to the configuration of the ridges and grooves at such a radial distance from the axis of the pulley that the spacing between opposite elements of the disks equals the length of a slat. To permit engagement of the slats with the disks as the chain links approach the pulley in a tangential path, provisions must be made for tilting movement of the slats about a transverse axis so that they can align themselves to radial ridges or grooves which at the moment of first engagement are not elongated at right angles to the direction of chain movement.

This problem is well known and several solutions have been proposed. It has been generally found with known chains of this type that the chains had to be made much heavier than was warranted by the transmitted forces if rapid wear was to be avoided and a reasonably long service life was to be achieved. This great weight and the corresponding cost of the chain and of the other transmission members capable of meshing with the chain has prevented this valuable transmission arrangement from achieving the wide application of which it would otherwise appear to be capable.

It is a basic object of this invention to provide a chain of the type described which for a given weight is capable of transmitting substantially greater forces than the chains which are now commonly employed.

Another object is a chain of relatively light weight which has a long useful life and is relatively immune to frictional wear.

A more specific object is the provision of a chain requiring a smaller number of parallel link plates in each chain link than conventional chains of comparable power transmission capacity.

With these and other objects in view, this invention mainly provides instead of the customary cage a cover plate which is transversely inserted in aligned openings of the link plates for absorbing the radially outward pressure of the slats as the chain moves arcuately over a pulley. According to an additional feature of the invention, the tilting movement of the slats is made possible by the provision of two thrust bars which are fixedly mounted in the link plates to confine a slat pack in a longitudinal direction. The thrust bars engage the adjacent slats with contact faces of suitable configuration to form a pivot for the tilting movement of the slats. Because of their fixed position, the thrust bars may be relatively light in weight, and their weight may be further reduced by hollowing them out to give them, for example, a U-shaped cross section.

The abutment surface of the cover plate is preferably flat or slightly vaulted to present a concave abutment surface to the slats through which radially outward stresses are transmitted.

Because of the increased carrying capacity of the chain of the invention, it is possible to space the individual link plates of a link laterally from each other a sufficient distance to make the use of a bearing sleeve or bushing for the link pin practical.

Other features and many of the attendant advantages of this invention will be readily appreciated as the same becomes better understood by reference to the following detailed description of preferred embodiments thereof when considered in connection with the accompanying drawings wherein.

Figure 1:
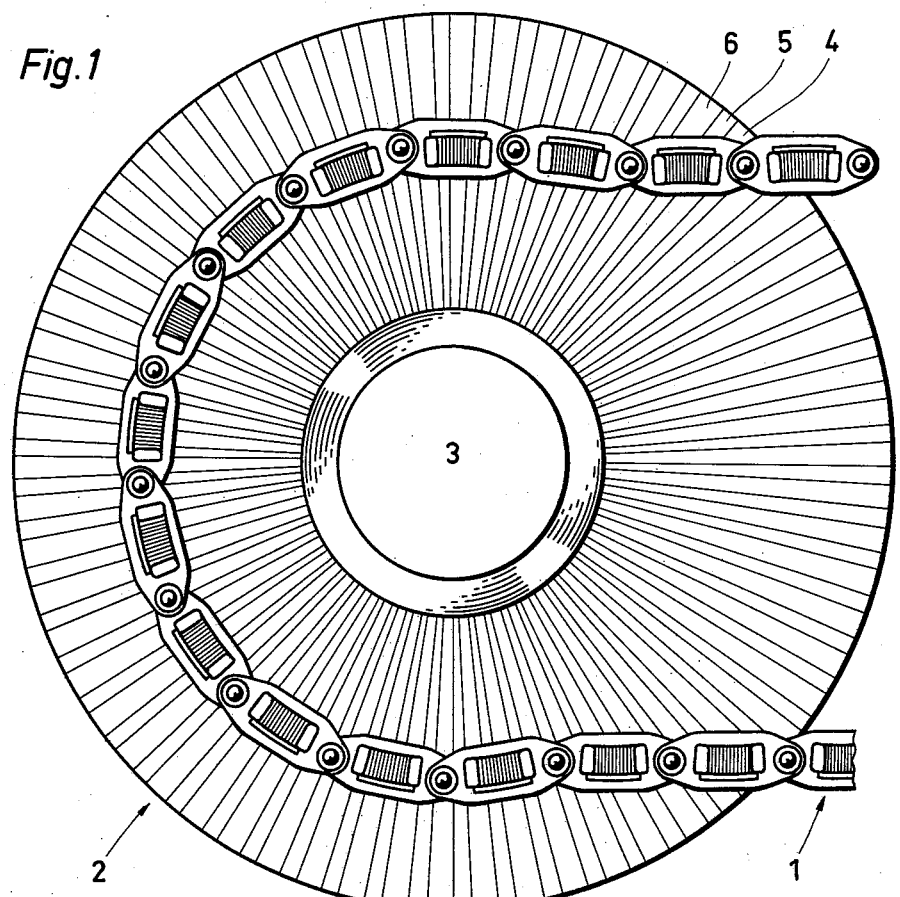
FIG. 1 is a fragmentary side elevational view of an infinitely variable speed transmission equipped with an embodiment of the chain of the invention.

Referring now to the drawings in detail, and initially to FIG. 1 there are shown elements of an infinitely variable speed transmission in which torque is transmitted from a driving shaft to a driven shaft by means of a chain cooperating with paired, approximately conical disks. In such a transmission arrangement the basic principle of which is well known, a pair of disks is mounted on each shaft with the approximately conical faces of the disks facing each other so as jointly to define a V-pulley over which a chain is trained. The disks of each pair are movable relative to each other in an axial direction to vary the width of the V-slot between them, and thereby the pitch diameter of the pulley since the axial width of the chain is substantially constant. This known structure is illustrated in FIG. 1 only to the extent necessary for illustrating the cooperation of the chain of the invention with the known conical disks.

There is seen in FIG. 1 a link chain 1 trained over a pulley constituted by two conical disks of which only one disk 2 is shown. The disk has a central bore 3 which engages one of the shafts partaking of the movement of the chain transmission. The conical face of the disk 2 is formed with ridges 4 which extend in a substantially radial direction. The tops of the ridges are flanked by sloping sides 5 which lead to the bottoms 6 of radially extending grooves. The second disk (not shown) is substantially identical with the disk 2 and angularly offset with respect thereto in such a manner that the ridges of one disk are axially aligned with the grooves on the other disk. The configuration of the ridges and grooves is such that the axially aligned portions of the conical faces are parallel in an axial plane oriented in any direction of movement of the chain over these portions.

For the sake of convenience, the individual chain links will be described as they appear oriented in the tangential chain strand at the top of FIG. 1. The terms "longitudinal" and "transverse" will hereinafter be employed as they apply to the direction of movement of the chain. The "upper" and "lower" side of a link will be understood to be those sides which are radially remote and radially adjacent respectively with reference to the axis of curvature as the chain travels over a pulley. The chain is, of course, capable of movement in a plane other than the vertical plane of movement illustrated in FIG. 1, and the aforementioned terms are intended merely to designate relative spacing of chain elements without reference to the direction of terrestrial gravity.

The elements of the chain 1 are best seen from FIGS. 2 to 7. As shown in side elevation in FIG. 2, the chain consists of a plurality of links 7, 7' connected by link pins 8 which extend transversely of the direction of movement of the chain and engage corresponding openings in the several link plates 9 of each link. Only one outermost plate 9 is visible in each link in FIG. 2. Each link plate 9 is formed with an elongated transverse opening 10 of longitudinally arcuate shape which holds a pack of metal slats 11. The slats 11 of each pack, which are known in themselves, are slidable in the openings 10 in a transverse direction relative to the link plates 9, and relative to each other so that the pack may conform to the configuration of the disks 2 which engage the ends of the slats as the links travel over the pulleys.

The slats of each pack are confined in a longitudinal direction, that is, in the direction of chain movement, by two thrust bars 12 which respectively engage the substantially flat outer face of the first and last slat in the pack, and transmit the longitudinal operating stresses of the transmission to the link plates 9 by abutment against the longitudinally spaced end walls of the elongated opening 10. The configuration of the engaging surfaces of the thrust bars 12 and of the link plates 9 in the opening 10 is such as to preclude any tilting movement of the thrust bars 12 about a transverse axis. In the embodiment illustrated in FIG. 2, the thrust bar is in mating contact with each link plate 9 over approximately one half of the bar circumference. The bars 12 are urged against the link plates by the pressure of the slats 11.

Substantially radially outward forces act on the slats 11 when the chain travels over a pulley. These stresses are absorbed and transmitted to the link plates 9 of each link 7, 7' by a cover plate 13 which extends longitudinally over all slats 11 of the pack. It passes transversely through the aligned openings 10 of all link plates 9 of the link in conforming engagement with the respective upper walls of the openings 10. Each cover plate is secured against transverse movement by a leaf spring 14 of arcuately deformed H-shape.

When the chain 1 travels over a pulley formed by two disks 2, it follows initially a straight path and is then deflected into a path which is an arc of a circle about the disk axis to which the initial straight path is tangential. The chain leaves the pulley in a path which is again tangential to the circle. During the arcuate movement, the slats of each link are in firm engagement with the conical faces of the disks and no relative movement occurs between the several elements of the link. Transition from tangential to arcuate movement requires a limited amount of rotation of the slats about a transverse axis as the slats simultaneously move radially and circumferentially relative to the disk faces as will be readily appreciated from the showing of FIG. 1. The slats are capable of rotating relative to each other, and relative to the thrust bars of the pack to permit their adjustment from an orientation in a plane perpendicular to the longituidnal direction. The features of the chain which permit this adjustment are not capable of representation on the relatively small scale of FIG. 2, and will become apparent as the disclosure proceeds.

Figure 2:
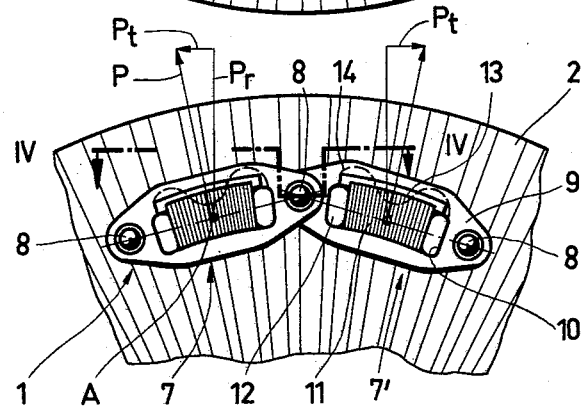
FIG. 2 shows a detail of the apparatus of FIG. 1 on an enlarged scale.
Figure 3:
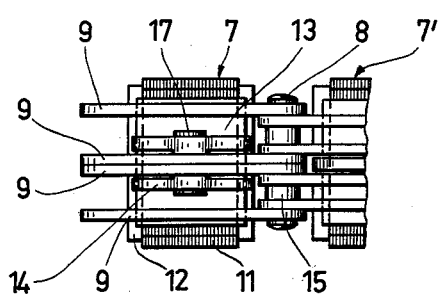
FIG. 3 illustrates the chain of FIG. 2 in a fragmentary plan view.
Figure 4:
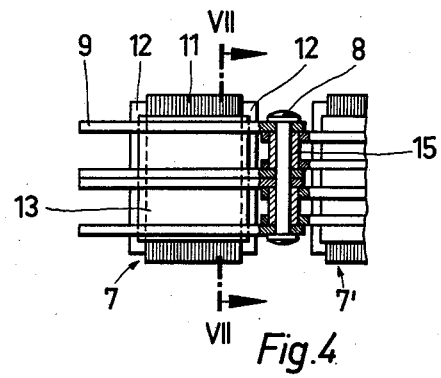
FIG. 4 is a partly sectional plan view of the chain of FIG. 2, the section being taken on the line IV—IV.

FIG. 3 shows one complete link 7 and portions of a second link 7' of the chain 1 in plan view from that side which faces outward during chain travel over a pulley. The link pin 8 which passes through aligned transverse openings in the four link plates 9 of each of the two connected links 7 and 7' carries two short bushings 15 better seen in FIG. 4 which shows most elements of FIG. 3 in a section through the axis of the link pin 8 on the line IV—IV of FIG. 2. The bushings 15 are each secured by press fit in transverse openings of two adjacent link plates 9 of the link 7' which is only partially shown in FIGS. 3 and 4. The internal diameter of the bushings 15 is substantially equal to that of the transverse openings in the link plates 9 of the other link 7 so as to receive the pin 8 with the necessary small amount of play. While only two links are illustrated in FIGS. 3 and 4, it will be understood that all links of the chain are alternatingly built in the illustrated manner, and thus each constitutes a rigid box structure. It will be appreciated that this arrangement which greatly contributes to the strength of the chain is predicated on the possibility of spacing the plates of the same link 7' along the aixs of the link pin by a distance greater than the width of a single link plate 9 of the connected link.

Figure 5:
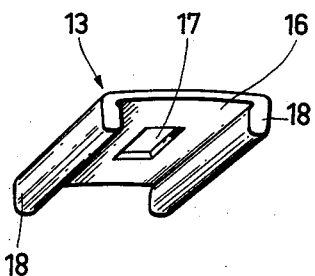
FIG. 5 is a perspective view on a greatly enlarged scale of an element of the chain of FIG. 2.

The cover plate 13 is shown in a perspective view on an enlarged scale in FIG. 5. It is seen to consist of a slightly vaulted plate portion 16 against the concavely arched underside of which the slats 11 abut at least during arcuate chain travel. The plate portion 16 is formed with a central rectangular opening 17 which is elongated in a transverse direction as better seen from FIG. 3. Ridges 18 on the transverse edges of the plate portion 16 extend therefrom in a direction which is radially inward when the chain travels over a pulley. The two ridges 18 assist in confining the slat pack and rest on the thrust bars 12. The convex top side of the plate portion 16 conformingly abuts against the link plates 9 in their respective openings 10.

Figure 6:
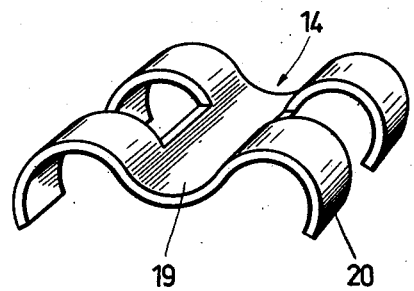
FIG. 6 shows another element of the chain of FIG. 2 in a perspective view on a scale greater than that of FIG. 5.

FIG. 6 shows the leaf spring 14 in a greatly enlarged perspective view. The spring is made of an H-shaped blank. The cross bar portion 19 of the blank is concavely arched from the original plane of the blank whereas the four legs 20 of the H-shape are bent into convexly arcuate shapes. In the assembled condition best seen in FIG. 3, the cross bar portion is located in the opening 17 of the cover plate and passes under two link plates 9 the combined width of which is approximately equal to the spacing of two parallel legs 20 of the springs so that the legs laterally abut against the plates 9. This arrangement secures the cover plate 13 against lateral displacement. The free ends of the legs 20 are resiliently pressed against the thrust bars 12 to hold them centered in the link 7.

Figure 7:
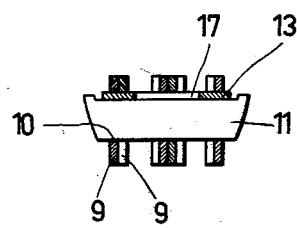
FIG. 7 shows a chain link of FIG. 4 in transverse section on the line VII—VII.

The shape of the slats 11 is best seen from FIG. 7 which is a sectional view taken along the line VII—VII of a chain link in FIG. 4. The slats are of conventional shape. They are thin metal blades elongated in the transverse direction of the chain and provided with stops to limit their transverse movement. They have a slightly thicker longitudinally extending central portion and taper from this central portion toward the cover plate 13 and the lower walls of the link plates 9 in the openings 10 on which they are slidably guided. The taper is very slight, of the order of magnitude of 1°. Because of the large number of thin slats 11 in each stack, this taper is adequate to permit the stack to conform to the arcuate shape of the opening 10 best seen in the side-elevational views of FIGS. 1 and 2, and to the corresponding arc of the cover plate 13, and to tilt as needed for engagement with the pulleys.

FIG. 7 shows the opening 17 which is adapted to receive the cross bar portion 19 of the leaf spring 14, but the spring itself has been omitted from both FIGS. 4 and 7 in order not to crowd the drawing.

Figure 8:
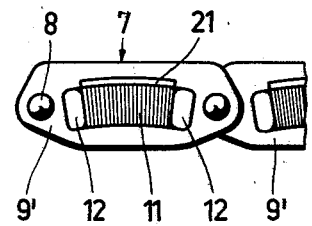
FIG. 8 shows a modified embodiment of the invention in a view substantially corresponding to that of FIG. 2.

FIG. 8 shows a complete link 7 and portions of a link connected with the former by a link pin 8. The view is in side elevation substantially as in FIG. 2, and the chain partially illustrated is very similar to that of FIG. 2. The main difference resides in the configuration of the cover plate 21 which lacks the ridges 18 of the cover plate 13. It extends in a flat arc only over the slat pack, but does not engage the thrust bars 12. The openings in the link plates 9' are suitably modified from the openings 10 so that the link plates closely envelop the thrust bars 12, the slats 11, and the cover plate 21 as is evident from FIG. 8.

Figure 9:
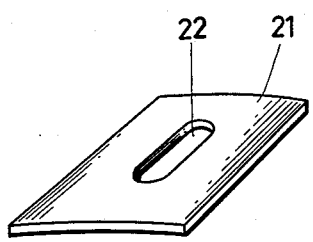
FIG. 9 is a perspective view of an element of the chain of FIG. 8 on an enlarged scale.

The cover plate 21 is shown separately on an enlarged scale in FIG. 9, a perspective view. It is very similar to the plate portion 16 of the cover plate 13, and has a central elongated opening 22 for engagement with a retaining spring of the type of the leaf spring 14. The rounded corners which distinguish the opening 22 from the opening 17 somewhat improve the mechanical strength of the cover plate 21.

Figures 10, 11:
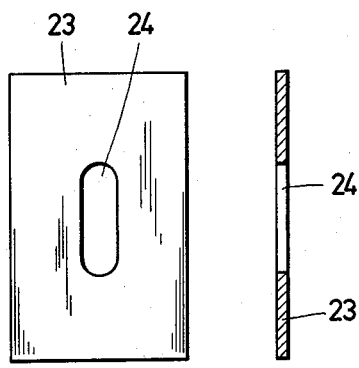
FIGS. 10 and 11 show a modification of the element of FIG. 9 in plan view and transverse section respectively.

FIGS. 10 and 11 respectively show a modified cover plate 23 in plan view and in section transversely of the chain. The plate 23 differs from the cover plate 21 by being entirely flat as best seen from FIG. 11 which shows a section along the longitudinal median plane of the opening 24 which has the same function as the corresponding openings 17 and 22 in the cover plates 13 and 21 respectively.

It will be understood that the cover plate 23 cooperates with link plates which have transverse openings with straight longitudinal walls as compared to the arcuate walls of the opening 10. This requires a greater freedom of tilting movement for the slats 11, and is therefore somewhat less desirable, but it simplifies manufacture of the cover plate to an extent which will frequently justify adoption of this shape.

Figure 12:
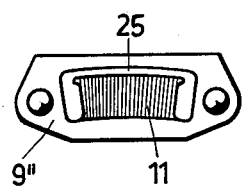
FIG. 12 shows a link of a third embodiment of the invention in a side elevational view.

It is possible to combine a cover plate and the two thrust bars for a pack of slats into a unitary structure, and a modified chain link embodying this feature is illustrated in side elevation in FIG. 12. The combined cover plate and thrust bar member 25 is somewhat more difficult and costly to produce than the constituent individual elements, but it affords a chain link assembly which is extremely compact and light in weight. The link plates 9'' are suitably cut out to receive the member 25 and the pack of slats 11.

Chains in infinitely variable speed transmissions of the type described are subjected to longitudinal stresses which are due to a large extent to the resistance offered by the driven shaft. In addition, there are longitudinal stresses caused by centrifugal forces acting on the chain during its arcuate travel about the pulleys. While the center of each link is tangentially aligned with the pitch circle of the pulley, and the circumferential forces have no tangential component at the link center, these forces have a circumferential component relative to the link pins 8 as will be appreciated from the vector diagram superimposed on FIG. 2. The centrifugal force P acting on the center of gravity A of each link has a component $P_r$ parallel to a radius of curvature of the arcuate chain path drawn through the axis of the link pin 8, and a component $P_t$ which is parallel to the corresponding tangent. The two components $P_t$ of two connected links act in opposite directions on the link pin and increase the contact pressure between the pin and the plate links.

The magnitude of the forces represented by the vector $P_t$ increases under otherwise equal conditions with increasing chain speed, with the length and weight of the individual links, and with decreasing pitch diameter of the pulleys over which they travel. Since the power which can be transmitted is a direct function of chain speed, it is desirable to operate the transmission at the highest possible chain speed, and modern infinitely variable speed chain transmission of the described type are preferentially operated at speeds at which the centrifugally induced stresses on the pins and the cooperating portions of the link plates are an important factor in determining the frictional wear of these elements, and thus the useful life of a chain.

The centrifugally induced stresses reduce the working load that a chain may carry in transmitting energy from a driving to a driven shaft. As chain speed increases, the chains have to be made heavier by an exponential factor since the greater weight of the chain itself leads to increasing centrifugally induced stresses. It is thus doubly important to keep the weight of the chain as low as possible.

The diameter of the pulleys is usually determined by considerations too important to permit an increase in pulley size for the mere purpose of improving chain performance, and the latter is usually comprised in the interest of small overall transmission size and a wide range of speed variation. Relatively rapid chain wear can be avoided only in exceptional cases by increasing the minimum pitch diameter of the pulleys.

It is evident from the vector diagram of FIG. 2 that the magnitude of the circumferential force $P_t$ can be reduced by closer spacing of the link pins 8, that is, by reducing the length of the individual links. The minimum pin spacing permissible is determined by the length of the slat pack, a substantially fixed parameter for a transmission of a given torque, and by the need for maintaining an adequate width of material between the opening 10 and the link pin 8. The last-mentioned factor also is fixed for the purposes of the present discussion. The chain of the invention makes best possible use of the available length of the link by reducing the number of elements in the opening 10 to the minimum, namely to the slats 11 and the thrust bars 12, avoiding a separate cage member enveloping the slat packs and thrust bars in conventional chains for variable speed transmissions of the described type. The cover plate 13 has substantially less weight than the usual cage and thus in itself reduces the centrifugal forces generated. The elimination of a cage portion which usually extends along the slats on the radially inward side of the pack reduces the overall radial width of the opening, 10, and thereby the width and weight of each link plate 9 for equal longitudinal stress section. Obviously, shorter links reduce the circumferential stresses on the pins 8 in a relationship which is logarithmic for the same reasons which make chain reinforcement unattractive for overcoming the effects of increased chain speed as was discussed in the preceding paragraphs.

The thrust bars 12 may be made of the strongest available materials without considering their frictional properties. There is no relative movement between the thrust bars and the link plates. Their engaged contact faces may be made as small as practical without any consideration of the friction effects of contact pressure. In conventional chains of this type, pressure is transmitted from the slats to the link plates by engaging elements at least some of which move during operation of the transmission relative to each other in the direction of their plane of contact. In some conventional chains the thrust bars have cylindrically shaped faces which are rotatable on conforming faces of a cage. Others provide for a similar movement of the cage itself the pressure transmitting face of which must be slidable on a cooperating face of a link plate in a direction transverse of the direction of pressure. The cooperating faces must either be made of self-lubricating materials, and none of the self-lubricating materials presently in use can claim mechanical strength comparable, for example, with that of alloy steel, or a lubricant film must be maintained between the faces. A lubricant film will remain unbroken only below a critical specific contact pressure and thus sets a lower limit for the combined thickness and thus for the weight of the link plates, even where such a limit would otherwise not be inherent in the tensile stresses carried by the chain. It is assumed that the plates are flat stampings, an assumption which is mandatory for reasons of manufacturing economy. No such limit exists with the chain of this invention which avoids rotary sliding movement of chain link elements, other than the link pins and cooperating portions of the link plates, utilizing means which will be more fully explained hereinbelow.

Figure 13:
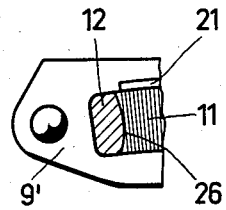
FIGS. 13 and 14 show modifications of the thrust bars of the chain of FIG. 2 together with cooperating other elements of a chain link, the view being taken in section on the plane of chain movement.
Figure 14:
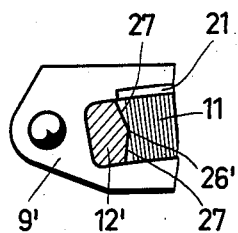

FIGS. 13 and 14 each shown a portion of a chain link of the type described in connection with FIG. 8. There is seen a link plate 9' holding a pack of slats and a cover plate 21 in a suitably shaped transverse opening. FIG. 13 also shows a thrust bar 12 identical with the bars shown in FIGS. 1–4, 8 and 12. Because of the larger scale of FIG. 13, important features of the thrust bar are more readily apparent than from the previous figures.

The thrust bar 12 is seen to have an approximately rectangular section, two corners of the rectangle being rounded off, and one side which represents a contact face 26 bulging outward. The contact face 26 has an approximately cylindrical shape with a fairly large radius of curvature. The line of contact of the face 26 with an adjacent slat 11 constitutes a pivot transverse of the chain movement about which the slat may tilt without any relative sliding movement between the slat 11 and the contact face 26. During the tilting movement of the slat, the contact line travels circumferentially along the cylindrical face 26, and tilting movement cannot produced when the contact line reaches the end of the contact face adjacent the upper or lower wall of the opening in the link plate 9'. The angle of maximum tilt of the slats 11 depends on the angle subtended by the arc of the contact face 26, not on its actual length, as will be readily appreciated. The maximum tilt of the slats 11 may thus be modified to suit the minimum pitch diameter of a pulley cooperating with the chain of the invention by varying the radius of curvature of the contact face of the thrust bar 12.

The other three sides of the modified rectangle which represents the cross section of the bar 12 conform to the respective terminal portions of the openings in the link plates which hold the slat pack so that the thrust bar is firmly secured against any rotary movement relative to the link plates. The thrust bars are also firmly anchored against movement in a direction transverse of the chain as has been described hereinbfeore.

Figure 15:
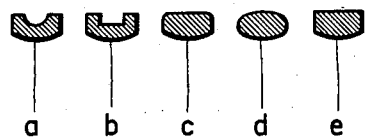
FIG. 15(a to e) illustrates in section five additional modifications of the thrust bar.

FIGS. 14 and 15 are merely illustrative of other cross sectional shapes of thrust bars which satisfy the requirements of this invention, and others will readily suggest themselves to those skilled in the art. The thrust bar 12' shown in FIG. 14 differs from the bar of FIG. 13 only in the configuration of its contact face 26' which consist essentially of two flat surface portions 27 which meet in a median plane at an abtuse angle. The apex of the angle is slightly rounded to provide a contact line between the face 26' and the adjacent slat 11 about which the slats may pivot. In this embodiment of the invention, the contact line remains substantially stationary during the tilting movement of the slats, and the movement is limited by abutment of the slat against one of the flat surface portions 27.

FIG. 15 shows five additional shapes which the cross section of the thrust bar of the invention may assume. The respective contact faces are represented by lines at the bottoms of these shapes as viewed in FIG. 15. Shapes $a$ and $b$ are U-shaped and the corresponding bars are channels which combine a flexural strength equal to that of a corresponding full shape with lighter weight the importance of which has been emphasized above. A choice between shapes $a$ and $b$ which provide indentical contact faces substantially similar to the face 26 of the thrust bar 12, may be controlled by specific requirements of application. For equal weight per unit length, shape $b$ has greater stiffness, but the stress concentration at the corners of the groove in the channel may outweigh this advantage.

Of the full shapes $c$, $d$, and $e$, the first and last have contact faces which meet the adjacent sides of the bar at a relatively sharp angle, whereas the contact face of shape $d$ gradually blends into the adjacent sides. The latter shape permits wider tilting of the slats but has the same tendency to return the slats to the neutral position illustrated, for example, in FIGS. 13 and 14, as the shapes $c$ or $e$. The latter differ from each other mainly in the configuration of the sides which are in permanent contact with the end walls of the transverse openings in the link plates. The sharply angular shape of $e$ offers stronger resistance to angular displacement than the more rounded shape $c$ (or $d$), but it may be less suited under certain conditions because of considerations of manufacturing economy and stress distribution. It will be appreciated that the shapes $c$, $d$, and $e$ will be complemented by conformingly shaped openings in link plates, whereas the shapes $a$ and $b$ fit into any openings having approximately rectangularly shaped terminal portions. The matching link plates have not been illustrated, but their configurations will be obvious from joint consideration of FIGS. 15 and, say, 2.

The specific features of this invention which distinguish the disclosed chain from those which are considered conventional in chain transmissions of the type referred to are jointly and individually effective in reducing the longitudinal stresses in the chain caused by centrifugal forces when the chain travels over an arcuate path. They thus particularly reduce the forces generated when the chain links change direction at the transition from a rectilinear approach path to the arcuate path about a pulley. The shortened, lighter chain link of this invention substantially reduces the harmful consequences of this tilting movement and permits an increase in the working load as compared to an otherwise similar conventional chain.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention as set forth in the appended claims.

What we claim is:

1. An elongated chain adapted to cooperate with a pulley mainly consisting of two disks having axially opposite conically shaped faces formed with radially extending ridges and grooves, the chain comprising a plurality of longitudinally consecutive links, each link including a plurality of link plate means partly overlapping the link plate means of the two adjacent links, the respective overlapping portions of the plate means being formed with aligned transverse apertures; link pin means received in said apertures for hingedly connecting adjacent links, the plurality of link plate means of one link being formed with aligned respective transverse openings intermediate said apertures, each of the latter link plate means having two longitudinally spaced end walls in the respective openings, and an upper and lower wall opposite each other and connecting said end walls; cover plate means in said openings in abutting contact with each of said upper walls; a plurality of thinblade members in longitudinally stacked juxtaposition to constitute a slat pack in said openings, said blade members laterally projecting from said one link for engagement with a cooperating disk and being movable in said openings for abutting contact with said cover plate means and said lower walls; and two bar members extending transversely through said openings of said one link in respective abutting contact with said end walls in the opening of each link plate means of said one link, said bar members being secured against rotary movement in said openings, and each bar member including contact face means abuttingly engaging an adjacent one of said blade members for pivotal movement of said one member about a transverse axis in said contact face means, whereby all plate members constituting said slat pack may jointly pivot in said openings about respective transverse axes.

2. A chain as set forth in claim 1, wherein said cover plate means defines an arcuately shaped abutment surface for contact with said blade members, said surface having a transversely extending axis of curvature.

3. A chain as set forth in claim 1, wherein said cover plate means defines a substantially flat abutment surface for contact with said blade members.

4. A chain as set forth in claim 1, wherein one of said bar members has a cross section of the approximate shape of a rectangle, one side of said rectangle defining said contact face means.

5. A chain as set forth in claim 1, wherein one of said bar members has a cross section of approximate U-shape, the bight portion of said U-shape defining said contact face means.

6. A chain as set forth in claim 1, wherein said contact face means is of convexly arcuate cross section.

7. A chain as set forth in claim 1, wherein said contact face has a transversely extending middle portion intermediate said upper and lower walls and slopes from said middle portion toward said upper and lower walls in a direction away from the adjacent blade member.

8. A chain as set forth in claim 1, wherein said bar member is fixedly secured in the openings of the respective link plate means.

9. A chain as set forth in claim 1, wherein said bar members are integral with said cover plate means.

10. A chain as set forth in claim 1, further comprising a tubular member fixedly mounted in the aligned apertures of the link plate means of said one link, said link pin means passing through said tubular member.

References Cited in the file of this patent

UNITED STATES PATENTS

| | | |
|---|---|---|
| 1,601,663 | Abbott | Sept. 28, 1926 |
| 1,691,892 | Reeves | Nov. 13, 1928 |
| 2,225,851 | Abbott | Dec. 24, 1940 |